United States Patent
Lin

(10) Patent No.: US 7,738,997 B2
(45) Date of Patent: Jun. 15, 2010

(54) ROBOTIC SYSTEM FOR SYNCHRONOUSLY REPRODUCING FACIAL EXPRESSION AND SPEECH AND RELATED METHOD THEREOF

(76) Inventor: Chyi-Yeu Lin, 4F, No. 9, Lane 14, Sec. 7, Chong-Shan N. Road, Taipei (TW)

( * ) Notice: Subject to any disclaimer, the term of this patent is extended or adjusted under 35 U.S.C. 154(b) by 1182 days.

(21) Appl. No.: 11/311,614

(22) Filed: Dec. 19, 2005

(65) Prior Publication Data

US 2007/0142965 A1    Jun. 21, 2007

(51) Int. Cl.
*G06F 19/00* (2006.01)
(52) U.S. Cl. ...................................... 700/245
(58) Field of Classification Search ................. 700/245, 700/246, 253, 258, 264; 901/1; 318/568.12
See application file for complete search history.

(56) References Cited

U.S. PATENT DOCUMENTS

2007/0128979 A1*  6/2007  Shackelford et al. ......... 446/484

OTHER PUBLICATIONS

C. Breazeal and J. Velasquez, Toward Teaching a Robot 'Infant' Using Emotive Communication Acts, Proc. of 1998 Simulation of Adaptive Behavior, Zurich, Switzerland, pp. 25-40.
F. Hara, "Artificial Emotion of Face Robot through Learning in Communicative Interactions with Human," Int'l Sym. on Robot and Human Interactive, Japan, 2004, pp. 7-15.
F. Pighin, et al., "Synthesizing Realistic Facial Expressions from Photographs," SIGGRAPH 98 Conference Proceedings, ACM SIGGRAPH, Jul. 1998, pp. 75-84.

* cited by examiner

*Primary Examiner*—Kim T Nguyen

(57) ABSTRACT

A robotic system and a related method for reproducing a real person's facial expression and speech simultaneously and synchronously is provided herein. The robotic system comprises at least a robotic head which in turn comprises a speaker, a plurality of face actuators, and a computing engine. The robotic head drives the speaker and the face actuators synchronously based on a speech segment and a sequence of time-stamped control vectors so that the robotic system could mimic a real person's facial expression and speech. The speech segment and the sequence of time-stamped control vectors are retrieved from a storage device of the robotic system, or from an external source via an appropriate communication mechanism.

31 Claims, 6 Drawing Sheets

ROBOTIC SYSTEM FOR SYNCHRONOUSLY REPRODUCING FACIAL EXPRESSION AND SPEECH AND RELATED METHOD THEREOF

BACKGROUND OF THE INVENTION

1. Field of the Invention

The present invention generally relates to robotic systems, and more particularly to a robotic system and a related method for reproducing a real person's facial expression and speech synchronously and simultaneously.

2. The Prior Arts

Recent robotic researches have shifted from traditional autonomous robots designed to operate as independently and remotely as possible from humans to humanoid robots that can communicate in a manner that supports the natural communication modalities of humans such as facial expression, body posture, gesture, gaze direction, voice, etc.

One such humanoid robot currently under development is the Kismet robot by the Robotics and Artificial Intelligence Laboratory of Massachusetts Institute of Technology. Kismet has a 15 degree-of-freedom robotic head whose ears, eyebrows, eyelids, lips, jaw, etc., are driven by actuators to display a wide assortment of facial expressions. For example, Kismet has four lip actuators, one at each corner of the mouth, so that the mouth can be curled upwards for a smile or downwards for a frown. Similarly, each eyebrow of Kismet can be lowered and furrowed in frustration, or elevated upwards for surprise. More details about Kismet could be found in the article "Toward Teaching a Robot 'Infant' using Emotive Communication Acts," by Breazeal, C. and Velasquez, J., in Proceedings of 1998 Simulation of Adaptive Behavior, workshop on Socially Situated Intelligence, Zurich, Switzerland, pp. 25-40, 1998.

Another similar research is the Tokyo-3 robot by the Hara Laboratory of Tokyo University of Science. The Tokyo-3 robotic head has a facial skin made of silicone so its facial expression is more resembling to that of real human. The actuators of Tokyo-3 robotic head drive 18 characteristic points of the facial skin to imitate various human expressions such as happiness, anger, sadness, resentment, surprise, horror, etc. More details about the Tokyo-3 robot could be found in the article "Artificial Emotion of Face Robot through Learning in Communicative Interactions with Human," by Fumio Hara, JST CREST International Symposium on Robot and Human Interactive Communication, Kurashiki Ivy Square, Kurashiki, Okayama, Japan, Sep. 20, 2004.

The focus of these foregoing researches is to engage the robot into natural and expressive face-to-face interaction with human. To achieve this goal, the robot usually perceives a variety of natural social cues from visual and auditory channels, and, in response to these sensory stimuli, delivers social signals to the human through gaze direction, facial expression, body posture, and vocal babbles autonomously. On the other hand, researches in seemingly unrelated areas such as pattern recognition and computer animation and modeling suggest an interesting application of the humanoid robotic head. For example, Pighin et al. (in the article "Synthesizing Realistic Facial Expressions from Photographs," by Pighin, F., Hecker, J., Lischinski, D., Szeliski, R., and Salesin, D. in SIGGRAPH 98 Conference Proceedings, pp. 75-84, ACM SIGGRAPH, July 1998) presents a technique for creating highly realistic face models and natural looking animations. Pighin et al. generates a 3D face model of a person by deriving feature points on several 2D images of the person's face from different viewpoints and using the feature points to compute the positions of the remaining face mesh vertices. Separate face models corresponding to the person's different facial expressions could be produced in this way. Pighin et al. then create smooth transitions between different facial expressions by 3D shape morphing between these different face models. It should be obvious that the technique of Pighin et al. could be readily adapted to the humanoid robotic head, for example, by locating the feature points at where the face actuators is positioned and using 3D shape morphing to guide the operation of the actuators. The result would be a humanoid robotic head, instead of generating generically humanlike expressions, but actually reproducing a specific real person's facial expression in very high degree of resemblance. Many similar facial expression interpretation techniques such as using neural networks, multiple point integrations, etc. could be found in the literature.

Besides facial expressions, another social signal delivered by the humanoid robotic heads of recent researches is the voice. For example, Kismet is equipped with a synthesizer that models the physiological characteristics of human's articulatory tract. By adjusting the parameters of the synthesizer, Kismet is possible to convey speaker personality as well as adding emotional qualities to the synthesized speech. Despite that, the humanoid robotic heads by recent researches are still made to deliver generically human-like voice, not a specific real person's voice. Following the thought of making a humanoid robotic head to reproduce a specific person's facial expression, it would make an even more interesting application if the person's own voice is pre-recorded and then played synchronously along with the humanoid robotic head's delivery of the person's facial expression.

SUMMARY OF THE INVENTION

Following up the recent progress in the robotic heads as described above, the present invention provides a robotic system and a related method for reproducing a real person's facial expression and speech synchronously and simultaneously.

The robotic system of the present invention comprises at least a robotic head which in turn comprises a speaker, a plurality of face actuators, and a computing engine. The robotic head drives the speaker and the face actuators synchronously based on a speech segment and a sequence of time-stamped control vectors so that the robotic system could mimic a real person's facial expression and speech. The speech segment and the sequence of time-stamped control vectors are retrieved from a storage device of the robotic system, or from an external source via an appropriate communication mechanism.

The robotic system could further comprise a recording device and an interpretation device which prepare the speech segment and the sequence of time-stamped control vectors. The recording device comprises at least a camera and a microphone with which a person's facial expression and the person's speech could be recorded simultaneously over a period of time. The recorded speech and video are then processed by the interpretation device to obtain the speech segment and the sequence of time-stamped control vectors. The speech segment and the sequence of time-stamped control vectors are then uploaded into the storage device of the robotic head, or are retrieved by the robotic head so that the robotic head could play the speech segment and, in the mean time, drive the face actuators according to the control vectors at appropriate times. As such, the robotic head is able to mimic a real person's speech and facial expression such as telling a joke, narrating a story, singing a song, or any similar oral performance. In addition to the system described above, a process for obtaining the speech segment and the sequence of time-stamped control vectors is also provided herein.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention is about making a robotic head to reproduce a real person's facial expression and speech synchronously. The robotic head of the present invention, unlike those used in the Kismet and Tokyo-3 projects, is not an autonomous one but purely driven by pre-prepared information to mimic a real person's facial expression and speech. A robotic head according the present invention should contain at least (1) a speaker; (2) a plurality of face actuators; and (3) a computing engine to drive the speaker and the face actuators.

Figure 1:
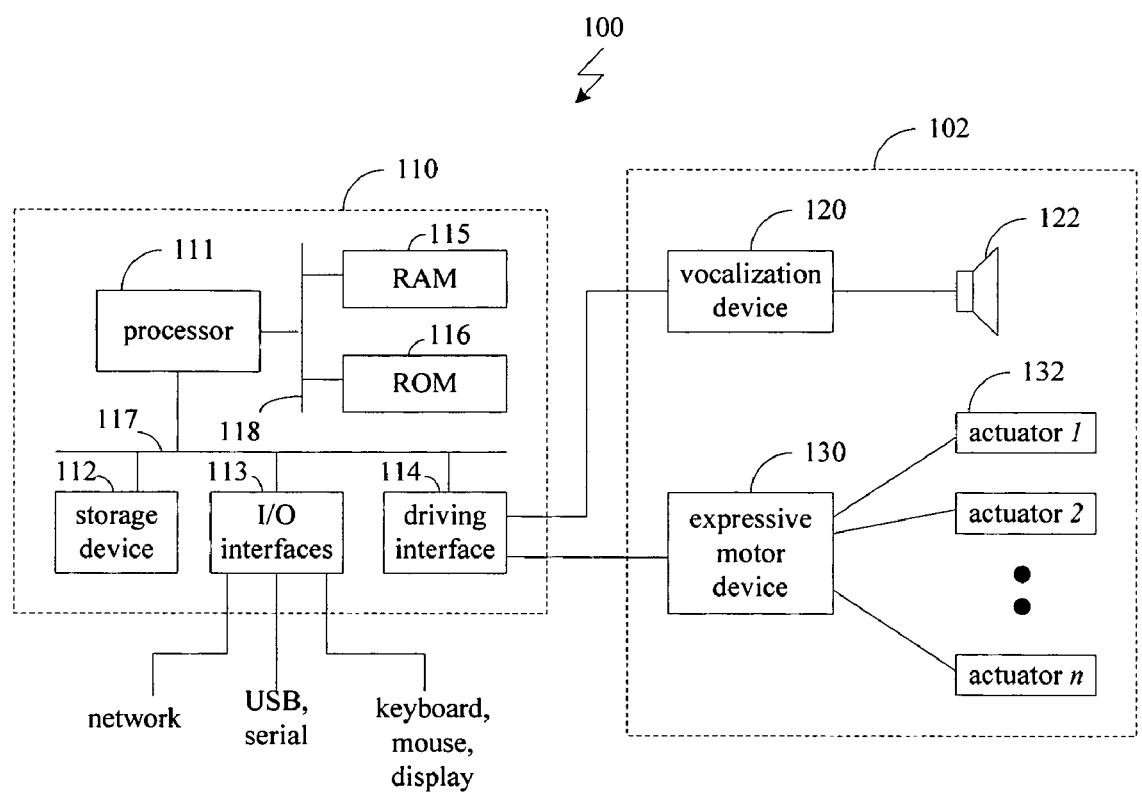
FIG. 1 is a schematic diagram showing a robotic head according to an embodiment of the present invention.

FIG. 1 is a schematic diagram showing a robotic head according to an embodiment of the present invention. As illustrated, the robotic head 100 contains a mechanical structure 102 resembling a person's head. The robotic structure 102 may have a facial skin like the one used in Tokyo-3 or it may just contain metallic parts like the one used in Kismet. A vocalization device 120 is installed inside the mechanical structure 102 which in turn drives the speaker 122 to play speech information pre-recorded in an appropriate format, or to generate synthesized speech. It is possible that vocalization device 120 and the speaker 122, or the speaker 122 alone, is installed somewhere outside of the mechanical structure 102 of the robotic head 100. The expressive motor device 130 is installed inside the mechanical structure 102, which has a number of face actuators 132 arranged at appropriate places on the mechanical structure 102 of the robotic head 100. The computing engine 110 could be housed inside the mechanical structure 102 or, as illustrated, could be an external device to the mechanical structure 102 and connected to the vocalization device 120 and the expressive motor device 130 via appropriate interface, wired or wireless. Depending on the part of the face that a face actuator is driving, the face actuators 132 may have different degrees of freedom and different extents regarding how far they could move in their various degrees of freedom.

The computing engine 110 of the robotic head 100 could be a conventional or similar computing device. For example, the computing engine 110 contains, among other components, a processor 111, an random access memory (RAM) 115 and a read-only memory (ROM) 116 connected to the processor 111 via a system bus 118, a storage device 112 and an input/output (I/O) interface 113 and a driving interface 114 connected to the processor 111 via the I/O bus 117. The storage device 112 could be a hard disk or laser disk drive for storing information such as the operating system and controlling programs for the robotic head 100. The I/O interface 113 could contain a network connector for connecting to a local area network, a USB (universal serial bus) port for accessing external storages, and appropriate ports for connecting to a keyboard, a mouse, and a display. There is also a driving interface 114 for connecting to the vocalization device 120 and the expressive motor device 130 of the robotic head 100.

Please note that this is a very simplified view of the computing engine 110 with a number of details such as controllers, power supply, etc. omitted, and this is by no means to restrict the embodiments of the computing engine 110 in any way. The major characteristic of the computing engine 110 is that it has the intelligence and the computing power to, via an appropriate driving interface 114, control the vocalization device 120 and the expressive motor device 130, which in turn drive their speaker 122 and face actuators 132, respectively, based on the information delivered to the computing engine 110 via an appropriate I/O interface 113 in real-time (i.e., an interactive mode of operation), or stored in its storage device 112 (i.e., a batch mode of operation). Please note that the vocalization device 120 and the expressive motor device 130 could actually be integral parts of the computing engine 110.

Assuming that the robotic head 110 has n (n>1) actuators 132, the driving of the actuators 132 from the computing engine 110 could be modeled as delivering a vector $V=\{A_1, A_2, \ldots, A_n\}$ from the computing engine 110 to the expressive motor device 130, which in turn, based on the parameter $A_i$ ($1 \leq i \leq n$), drives the ith actuator 132. Depending on the characteristics of the corresponding ith actuator 132, the parameter $A_i$ describes, for example, how the actuator 132 moves in its various dimensions (i.e., degrees of freedom) and to what extent at each dimension. Since the actuators 132 are not identical, for example, the actuator for the eyebrow may have only one degree of freedom while the actuator for the ear may have two degrees of freedom, the parameters $A_1, A_2, \ldots, A_n$ may contain different amount of information and may be in different formats. However, they are modeled as such for simplicity.

Accordingly, to deliver continuously changing facial expression, basically all that is required is to store an appropriate sequence of the vectors $V_1, V_2, V_3, \ldots V_m$ (m>1) on the storage device 112 of the computing engine 110, and then to have the computing engine 110 to read this sequence of vectors and deliver them, one vector at a time, to the expressive motor device 130. In an alternative embodiment, the sequence could also be retrieved from an outside source by the computing engine 110 via a network interface 113, and the computing engine 110 delivers the sequence to the expressive motor device 130. However, to mimic a real person's facial expression, the computing engine 110 would require timing information about when to issue a particular vector and for how long to wait before issuing the next vector. Accordingly, the vector sequence could be extended to be a time-stamped vector sequence as follows:

$$V_1 = \{A_{11}, A_{12}, \ldots, A_{1n}, t_1\}$$
$$V_2 = \{A_{21}, A_{22}, \ldots, A_{2n}, t_2\}$$
$$V_3 = \{A_{31}, A_{32}, \ldots, A_{3n}, t_3\}$$
$$\vdots$$
$$V_m = \{A_{m1}, A_{m2}, \ldots, A_{mn}, t_m\}$$

$t_i$ is the time for issuing the vector $V_i$. $t_i$ could stand for the time interval after the first vector $V_1$ is issued, or it could stand for the time interval after the previous vector $V_{i-1}$ is issued.

On the other hand, the speech segment could be a segment of pre-recorded speech or it could be a sequence of time-stamped synthesis commands derived from human voice. The segment of pre-recorded speech could be in an appropriate analog or digital (such as WAV, MP3, etc.) format. The computing engine 110 retrieves the speech segment from the storage device 113, converts it into a format required by the vocalization device 120, and delivers it to the vocalization device 120 which in turn plays it out via its speaker 122. Similarly, in an alternative embodiment, the speech segment could also be retrieved from an outside source to the computing engine 110 via a network interface 113, and the computing engine 110 delivers the speech segment to the vocalization device 120. If the speech segment is a sequence of time-stamped synthesis how the actuators 132 are driven to deliver facial expression. Please note that, in order to play the speech segment (or to issue the sequence of synthesis commands) and to deliver the vector sequence simultaneously, the computing engine 110 requires some parallel mechanism. For example, the computing engine 110 has a real-time clock (not shown in FIG. 1) for timing, and it also has the interrupt mechanism associated with the real-time clock to trigger the delivery of a specific vector or the issuance of a specific synthesis mechanism are common in conventional computers.

Figure 2:
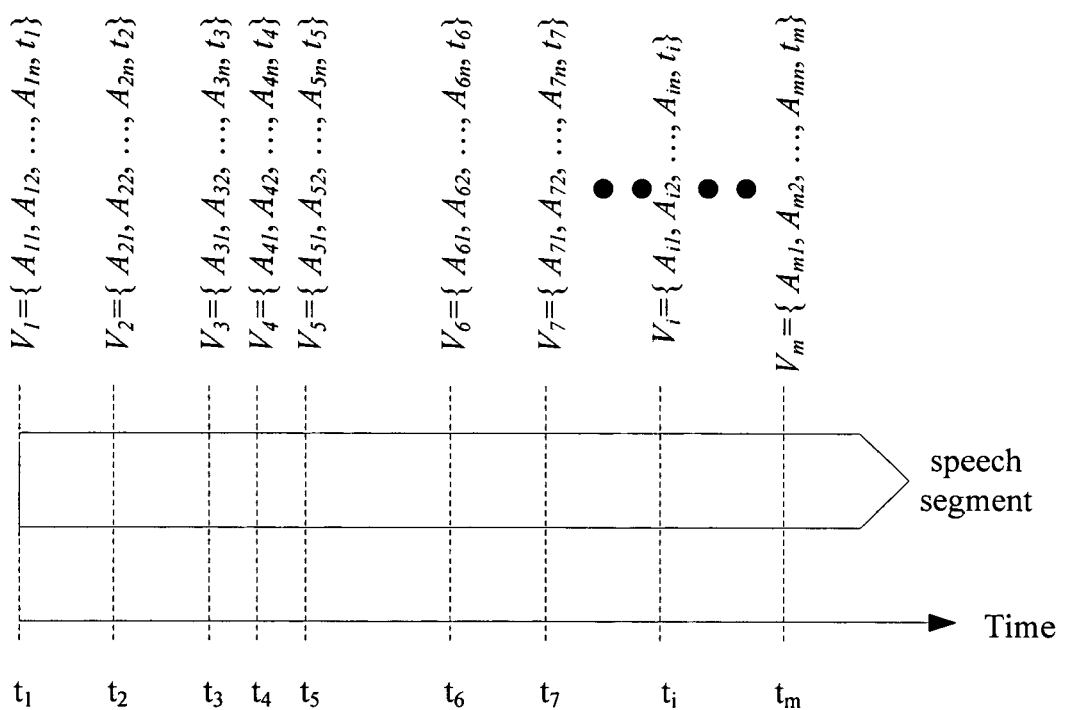
FIG. 2 is a schematic diagram showing the relationship between the speech segment and the series of time-stamped control vectors.

Therefore, a major characteristic of the present invention is about the generation of the speech segment along with a sequence of control vectors so that a robotic head 100 could, by playing out the speech via its speaker 122 and generate continuously changing facial expressions by its face actuators 132. The relationship between the speech segment and the vector sequence is illustrated in FIG. 2. As illustrated, the time stamp binds a vector to a specific time during the speech segment so that the facial expression controlled by the specific vector is corresponding to the emotion of the speaker at that particular time. Where the vectors are denser together, it is the period of time that the speaker is more emotional and has more abrupt changes in terms of his or her facial expression.

Figure 3:
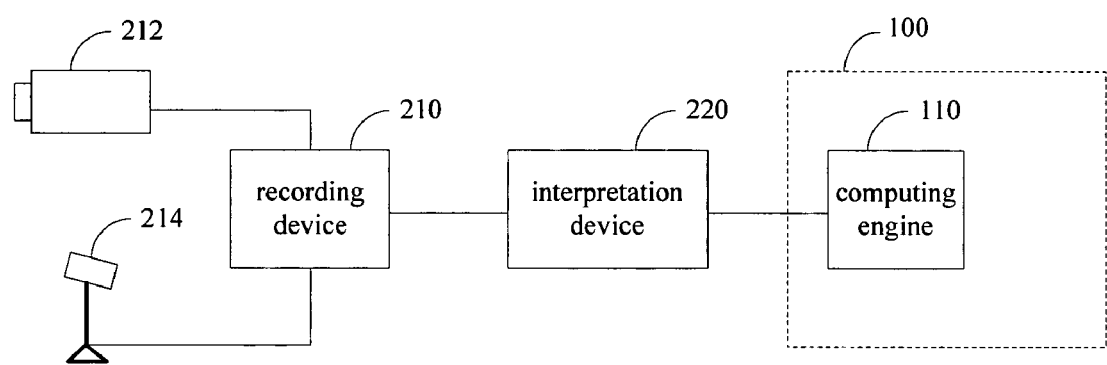
FIG. 3 is a schematic diagram showing a robotic system according to an embodiment of the present invention.

To generate the speech segment and the synchronized actuator vector sequence, a robotic system according to an embodiment of the present invention, as illustrated in FIG. 3 further contains a recording device 210 and an interpretation device 220. The recording device 210 contains one or more cameras 212 and a microphone 214 for recording both a speaker's facial expression and his or her speech over a period of time. If there are multiple cameras 212, they are usually positioned so that the person's performance is recorded from different viewing angles.

The most important function of the recording device 210 is to obtain recording(s) of the facial expression and speech. The facial expression and speech could be recorded into a single recording (e.g., a single audio/video clip) or into separate recordings. It is also possible that the facial expression and the speech are recorded separately at different times. It is also possible that the facial expression and the speech are performed by different persons. However, the most common scenario is that a same person's facial expression and speech are captured simultaneously and synchronously. Therefore, the following explanation focuses on this most common scenario first.

The recording device 210 could be as simple as a camcorder which records both the facial expression and speech into a single audio/video clip on a removable media such as a tape or a laser disc. The recording device 210 could also be a computing device such as a desktop computer installed with an appropriate recording application program with a camera and microphone, built-in or externally connected, and the speech and the facial expression are recorded into a single audio/video file or into separate files. As can be imagined, there are various possible implementations for the recording device 210. Please note that the speech recorded could be in a form already suitable for playing on the robotic head 100, or it requires further processing by the interpretation device 220. Besides using a removable media as a communication mechanism, the recording device 210 and the interpretation device 220 could have a direct link mechanism such as a local area network. In this way, the recording device 210 could actually capture the facial expression and speech and transmit the captured information to the interpretation device 220 via the local area network almost, if not entirely, simultaneously. Please also note that, in some embodiment, the robotic system of the present invention does not contain a recording device 210 where the recording is conducted somewhere else and the recording(s) are brought to the interpretation device 220 for further processing. There are also embodiments where the recording device 220 only captures facial expressions while the speech is recorded somewhere else. There are also embodiments where the recording device 220 only captures speech while the video is recorded somewhere else. Please note that, if the facial expressions and the speech are not recorded simultaneously, they have to be aligned, or synchronized, in time, which will be conducted by the interpretation device.

Figure 4:
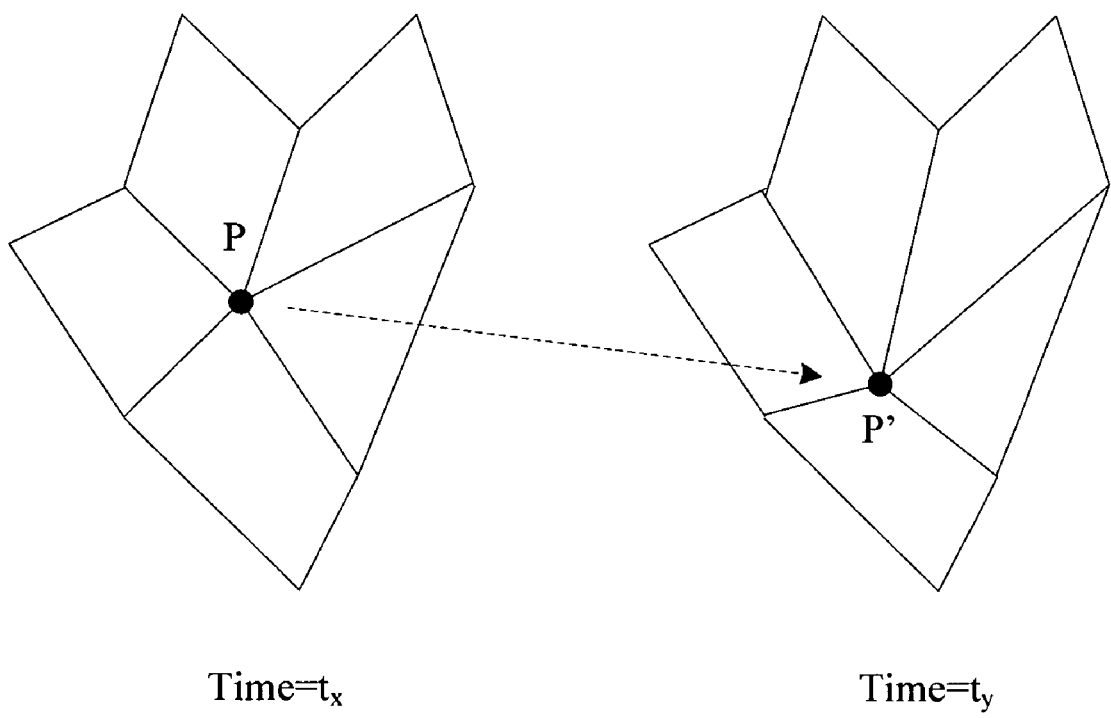
FIG. 4 is a schematic diagram showing how the control parameter for a face actuator is derived from a 3D face model.

The interpretation device 220 is usually a computing device with an interpretation application program. The computing device is equipped with the appropriate mechanism for accessing the removable media where the recorded speech and the facial expression are stored. In some embodiment, the interpretation device 220 and the recording device 210 are actually integrated into a single computing device. In this embodiment, the interpretation application program simply accesses the file(s) generated by the recording application program. The interpretation program has appropriate knowledge about the actuators 132 on the robotic head 100 and their characteristics. Then, by employing a technique according to Pighin et al. as mentioned earlier, or other similar approaches, the interpretation program can extract face mesh points from the images recorded in the video file(s) and, based on how the face mesh points change in terms of space (e.g., how and in what direction they move) and time (e.g., how fast), the interpretation program is able to transform the information into the parameters for controlling the actuators 132 of the robotic head 100 as shown in FIG. 1. FIG. 4 is a schematic diagram showing roughly how this is achieved. Assuming that the ith face actuator 132 is located at a location P in the 3D model, based on the algorithm, the mesh point at location P changes from its current location at time $t_x$ to a new location P' at time $t_y$. Then, the control parameter $A_i$ could be derived based on the space vector PP' (i.e., the dashed arrow in FIG. 4) and the time difference ($t_y$-$t_x$). The technique or algorithm of the interpretation device 220 or the interpretation program is not part of the present invention and many such algorithms are already available from the related arts in the academic arena. However, one point has to be pointed out is that, if the speech and the facial expression are recorded simultaneously, the processing of the video file(s) and the production of the actuator vectors could be conducted independently from the production of speech segment. However, if the speech and the facial expression are recorded separately, a user has to align the recorded speech and the facial expression first on the interpretation device 220 before the interpretation device 220 could begin its processing. Alignment could be achieved in various ways. For example, a user could chop off some recorded speech (or video), or assign a start time of the speech relative to the start of facial expressions (or, vice versa).

The processing of the recorded speech by the interpretation device 220 could be as simple as converting it into a format suitable for playing by the vocalization device 120. If the speech segment has to be a sequence of time-stamped synthesis commands, the interpretation device 220 would derive the sequence of time-stamped synthesis commands for the vocalization device 120 from the recorded speech. Again, if the speech and the facial expression are recorded simultaneously, the processing of the recorded speech and the production of the speech segment could be conducted independently from the production of actuator vector sequence. If the speech and the facial expression are recorded separately, they have to be appropriately aligned.

Figure 5:
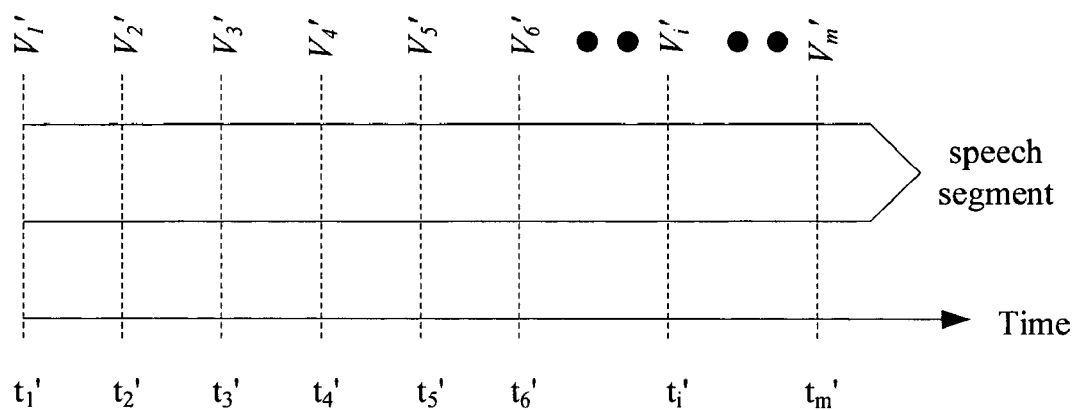
FIG. 5 is a schematic diagram showing the speech segment and the series of time-stamped control vectors produced by the interpretation device of the present invention.

Optionally, the interpretation device 220 could further contain an editing application program for a user to simulate the reproduction of the speech segment and the synchronized actuator vectors on a 3D model, using the same technique as described in Pighin et al. or similar approaches but applying it in reverse (i.e., using the actuator vectors to regenerate the 3D model's face mesh points, instead of the other way around). Then, during the simulation, a user could choose to delete extraneous vectors (as the facial expression remains unchanged) or insert additional vectors by interpolation (as the facial expression undergoes abrupt change) or modify existing vectors. The reason for this editing is that, as the interpretation program does not have any knowledge regarding how the facial expression varies along with time and the images retrieved from the video file(s) are treated equally, the interpretation program usually generates the vectors at fixed time intervals, as shown in FIG. 5. As illustrated, the time-stamps $t_1'$, $t_2'$, $t_3'$, . . . , $t_m'$ of vector sequence $V_1'$, $V_2'$, $V_3'$, . . . $V_m'$ have fixed intervals. This inevitably leaves out some important details or keeps too much unnecessary information, and a user is therefore required to step in to make up the inefficiency of the interpretation program. After the editing, a vector sequence similar to that shown in FIG. 2 would be obtained, with more vectors in a shorter interval $t_3$-$t_5$ and less vectors in a longer interval $t_5$-$t_7$.

The resulting speech segment and the appropriate time-stamped vector sequence are then delivered to the computing engine 110 of the robotic head 100. Depending on uploading or communication mechanism provided by the interpretation device 220 and the robotic head 100, this can be achieved via a removable media, or via a direct link such as a local area network, or via any other appropriate means.

Figure 6:
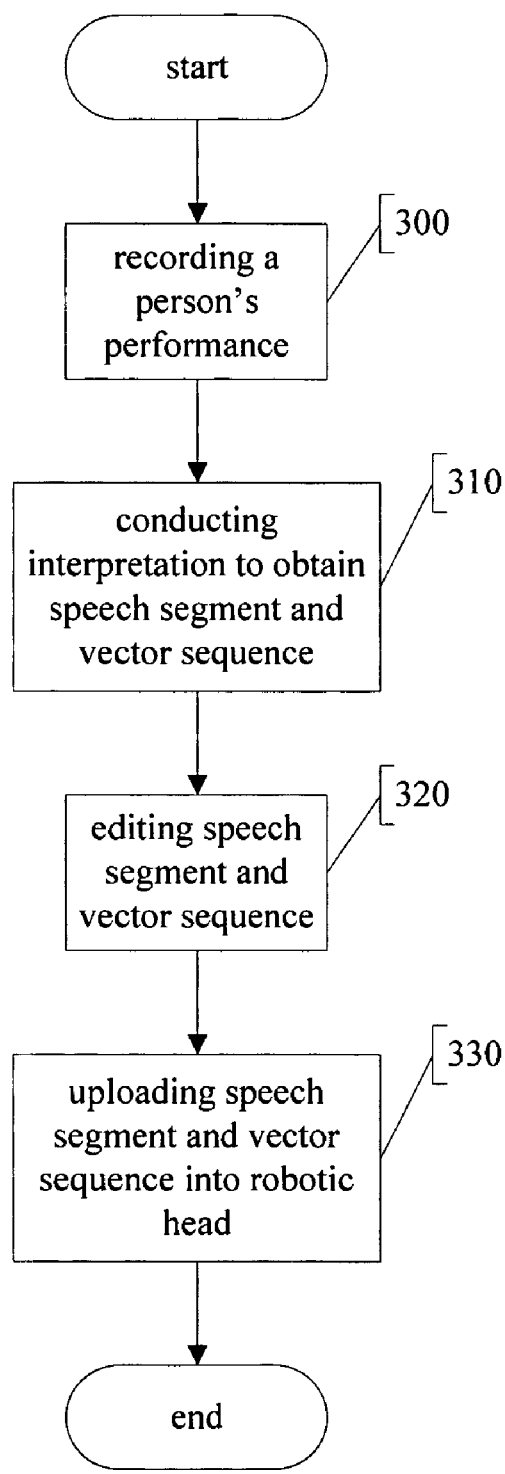
FIG. 6 is a flow chart showing the various steps of the method for producing and performing the speech segment and control vectors according to an embodiment of the present invention.

Based on the foregoing description, a similar process for obtaining and performing the speech segment and the vector sequence is shown in FIG. 6. As shown, the process starts with the step 300, in which a person's performance such as telling a joke, making a speech, singing a song, or reporting an event is recorded. As noted earlier, the video and speech portion of the recording could be stored separately or together in a single file or a single audio/video clip. Please note that the speech could be recorded directly in a form suitable for playing on a robotic head or it requires further processing. Then, in step 310, the recorded speech and the images of the recorded video are optionally aligned and processed, according to an algorithm such as the one used by Pighin et al., and based on the knowledge of the robotic head's vocalization device and expressive motor device, to obtain a speech segment for playing on the robotic head and a series of time-stamps control vectors for driving the face actuators of the robotic head at appropriate times. An optional step 320 allows a user to view and simulate the effect of the speech segment and the vector sequence delivered simultaneously and, during this process, the user is allow to delete, modify, and insert vectors to fine-tune their performance. Finally, in the step 330, the resulting speech segment and vector sequence are delivered to the robotic head over an appropriate mechanism and performed by the robotic head accordingly.

Various variations to the foregoing process could be implemented. For example, as mentioned earlier, the robotic system of the present invention could have no recording device and obtain the recorded speech and facial expressions from somewhere else. Therefore, the step 300 would become to obtain the recorded speech and facial expressions. Also some details are omitted in the foregoing process for simplicity. For example, two types of speech segment could be produced by the step 310: one is the recorded voice in an appropriate analog or digital format; and the other one is a sequence of time-stamped synthesis commands.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A robotic system for reproducing a person's facial expression and speech comprising:
 a robotic head comprising a speaker, a plurality of face actuators, and a computing engine connected to said speaker and said face actuators, said computing engine driving said face actuators based on a sequence of sets of control parameters while delivering speech from said speaker based on a speech segment;
 wherein each of said sets of control parameters includes a time stamp and a control parameter corresponding to each of said face actuators; and said computing engine drives said face actuators at appropriate time specified by the time stamps of said sets of control parameters so that said face actuators are activated according to the corresponding control parameters to reproduce said person's facial expression.

2. The robotic system according to claim 1, wherein said computing engine comprises a storage device; and said computing engine retrieves said speech segment and said sequence of sets of control parameters from said storage device.

3. The robotic system according to claim 1, wherein said computing engine comprises an appropriate interface; and said computing engine retrieves said speech segment and said sequence of sets of control parameters from an external device via said interface.

4. The robotic system according to claim 1, wherein said speech segment is a segment of pre-recorded speech in an appropriate format.

5. The robotic system according to claim 1, wherein said speech segment is a sequence of synthesis commands; each of said synthesis commands is associated with a time stamp; said computing engine artificially synthesizes speech at the time specified by the time stamp of a synthesis command according to said synthesis command.

6. The robotic system according to claim 1, further comprising:
an interpretation device, said interpretation device generating said speech segment from a recorded speech; said interpretation device generating said sequence of sets of control parameters from a recorded video; and said interpretation device delivering said speech segment and said sequence of sets of control parameters to said computing engine via an appropriate mechanism.

7. The robotic system according to claim 6, wherein said appropriate mechanism is one of the following two mechanisms: a removable media and a direct link.

8. The robotic system according to claim 7, wherein said direct link is a local area network.

9. The robotic system according to claim 6, wherein said interpretation device allows a user to add an additional set of control parameters into said sequence of sets of control parameters, and to delete and modify an existing set of control parameters from said sequence of sets of control parameters.

10. The robotic system according to claim 6, wherein said recorded speech and said recorded video are combined in a single recording.

11. The robotic system according to claim 6, wherein said interpretation device allows a user to align said recorded speech and said recorded video so that said recorded speech and said recorded video have synchronized staffing time.

12. The robotic system according to claim 6, wherein said interpretation device comprises at least one of a camera and a microphone; said interpretation device operates at least one of said camera and said microphone to capture said person's performance over a period of time and to produce at least one of said recorded speech and said recorded video.

13. The robotic system according to claim 6, wherein said interpretation device obtains at least one of said recorded speech and said recorded video from an external source via an appropriate mechanism.

14. The robotic system according to claim 13, wherein said appropriate mechanism is one of the following two mechanisms: a removable media and a direct link.

15. The robotic system according to claim 14, wherein said direct link is a local area network.

16. The robotic system according to claim 6, further comprising:
a recording device comprising at least one of a camera and a microphone; said recording device operating at least one of said camera and said microphone to capture said person's performance over a period of time to produce at least one of said recorded speech and said recorded video, and said recording device delivering at least one of said recorded speech and said recorded video to said interpretation device via an appropriate mechanism.

17. The robotic system according to claim 16, wherein said appropriate mechanism is one of the following two mechanisms: a removable media and a direct link.

18. The robotic system according to claim 17, wherein said direct link is a local area network.

19. The robotic system according to claim 16, wherein said recorded speech and said recorded video are combined in a single recording.

20. A method for reproducing a person's facial expression and speech on a robotic head, said robotic head comprising a speaker and a plurality of face actuators, said method comprising the steps of:
(1) operating at least a camera and a microphone to capture said person's performance over a period of time into a recorded speech and a recorded video having synchronized timing information for said person's facial expression and speech;
(2) processing said recorded speech and said recorded video to produce a speech segment and a sequence of sets of control parameters, each of said sets of control parameters including a time stamp derived from said timing information and a control parameter corresponding to each of said face actuators, each of said control parameters controlling one of said face actuators respectively; and
(3) delivering said person's speech based on said speech segment via said speaker while driving said face actuators at appropriate time specified by the time stamps of said sets of control parameters so that said face actuators are activated according to the corresponding control parameters to reproduce said person's facial expression.

21. The method according to claim 20, further comprising the following step between said step (2) and said step (3):
(2.5) allowing a user to add an additional set of control parameters into said sequence of sets of control parameters, and to delete and modify an existing set of control parameters from said sequence of sets of control parameters.

22. The method according to claim 20, wherein said speech segment is obtained by converting said recorded speech into an appropriate format.

23. The method according to claim 20, wherein said speech segment is a sequence of synthesis commands derived from said recorded speech; each of said synthesis commands is associated with a time stamp; and delivering said person's speech is by artificially synthesizing speech at the time specified by the time stamps of said synthesis commands according to said synthesis commands.

24. The method according to claim 20, wherein said recorded speech and said recorded video are combined in a single recording.

25. The method according to claim 20, further comprising the following step between said step (1) and said step (2):
(1.5) allowing a user to align said recorded speech and said recorded video so that said recorded speech and said recorded video have synchronized start time.

26. A method for reproducing a person's facial expression and speech on a robotic head, said robotic head comprising a speaker and a plurality of face actuators, said method comprising the steps of:
(1) obtaining a recorded speech and a recorded video of said person's speech and facial expression, said recorded speech and said recorded video having appropriate timing information;
(2) processing said recorded speech and said recorded video to produce a speech segment and a sequence of sets of control parameters, each of said sets of control parameters including a time stamp derived from said timing information and a control parameter corresponding to each of said face actuators, each of said control parameters controlling one of said face actuators respectively; and (3) delivering said person's speech based on said speech segment via said speaker while driving said face actuators at appropriate time specified by the time stamps of said sets of control parameters so that said face actuators are activated according to the corresponding control parameters to reproduce said person's facial expression.

27. The method according to claim 26, further comprising the following step between said step (2) and said step (3):

(2.5) allowing a user to add an additional set of control parameters into said sequence of sets of control parameters, and to delete and modify an existing set of control parameters from said sequence of sets of control parameters.

28. The method according to claim 26, wherein said speech segment is obtained by converting said recorded speech into an appropriate format.

29. The method according to claim 26, wherein said speech segment is a sequence of synthesis commands derived from said recorded speech; each of said synthesis commands is associated with a time stamp; and delivering said person's speech is by artificially synthesizing speech at the time specified by the time stamps of said synthesis commands according to said synthesis commands.

30. The method according to claim 26, wherein said recorded speech and said recorded video are combined in a single recording.

31. The method according to claim 26, further comprising the following step between said step (1) and said step (2):

(1.5) allowing a user to align said recorded speech and said recorded video so that said recorded speech and said recorded video have synchronized start time.

* * * * *